Figure 1:
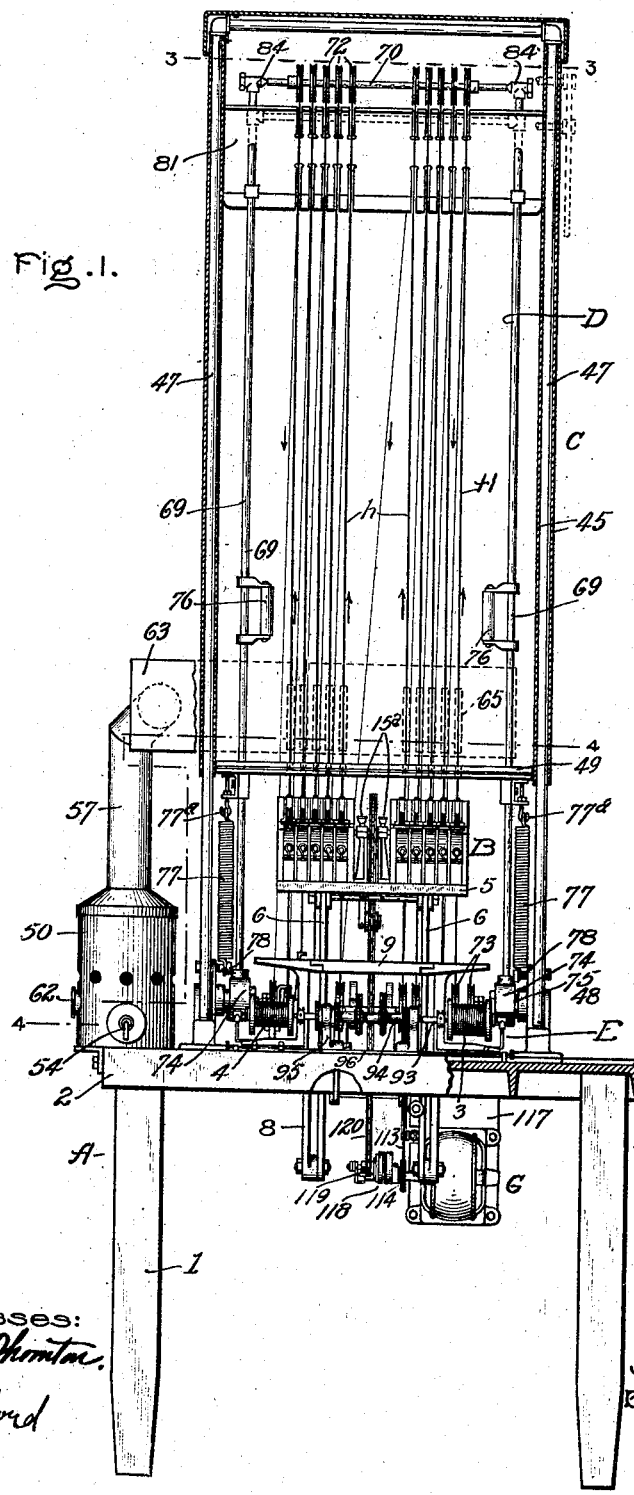

No. 894,592. PATENTED JULY 28, 1908.
J. G. CALLAN.
WIRE COATING MACHINE.
APPLICATION FILED MAY 9, 1905.

8 SHEETS—SHEET 1.

Witnesses:
George A. Thornton
Helen Oxford

Inventor,
John G. Callan,
By Albert G. Davis
Att'y.

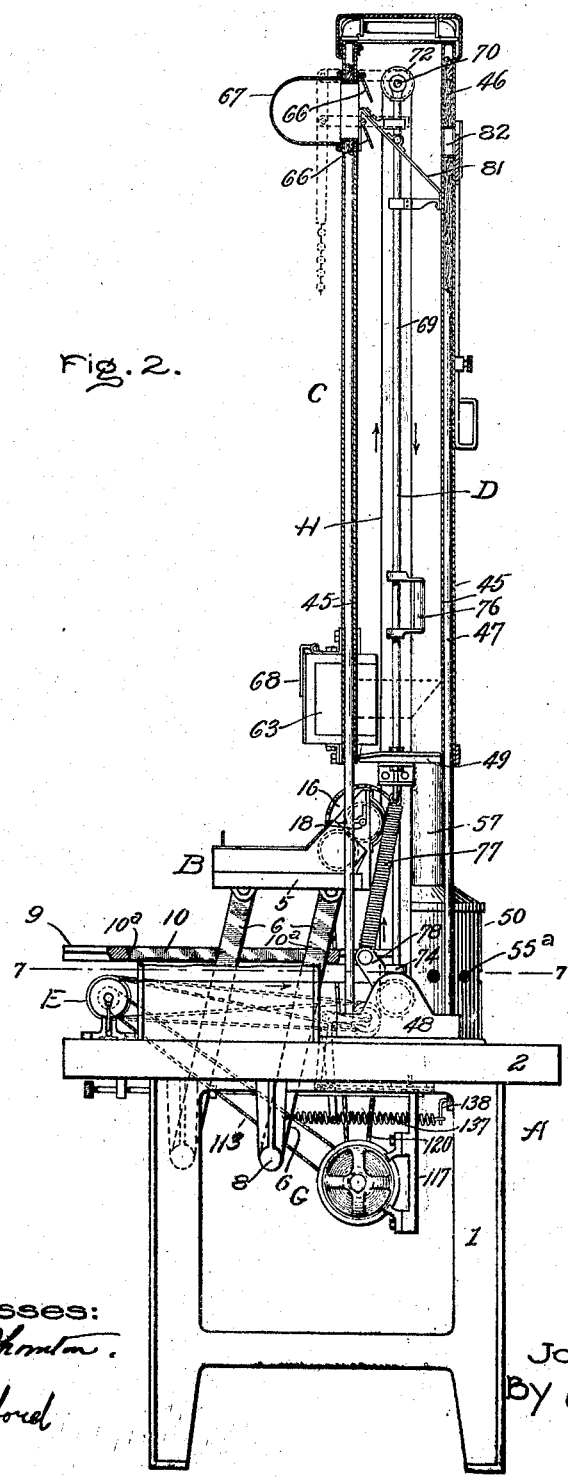

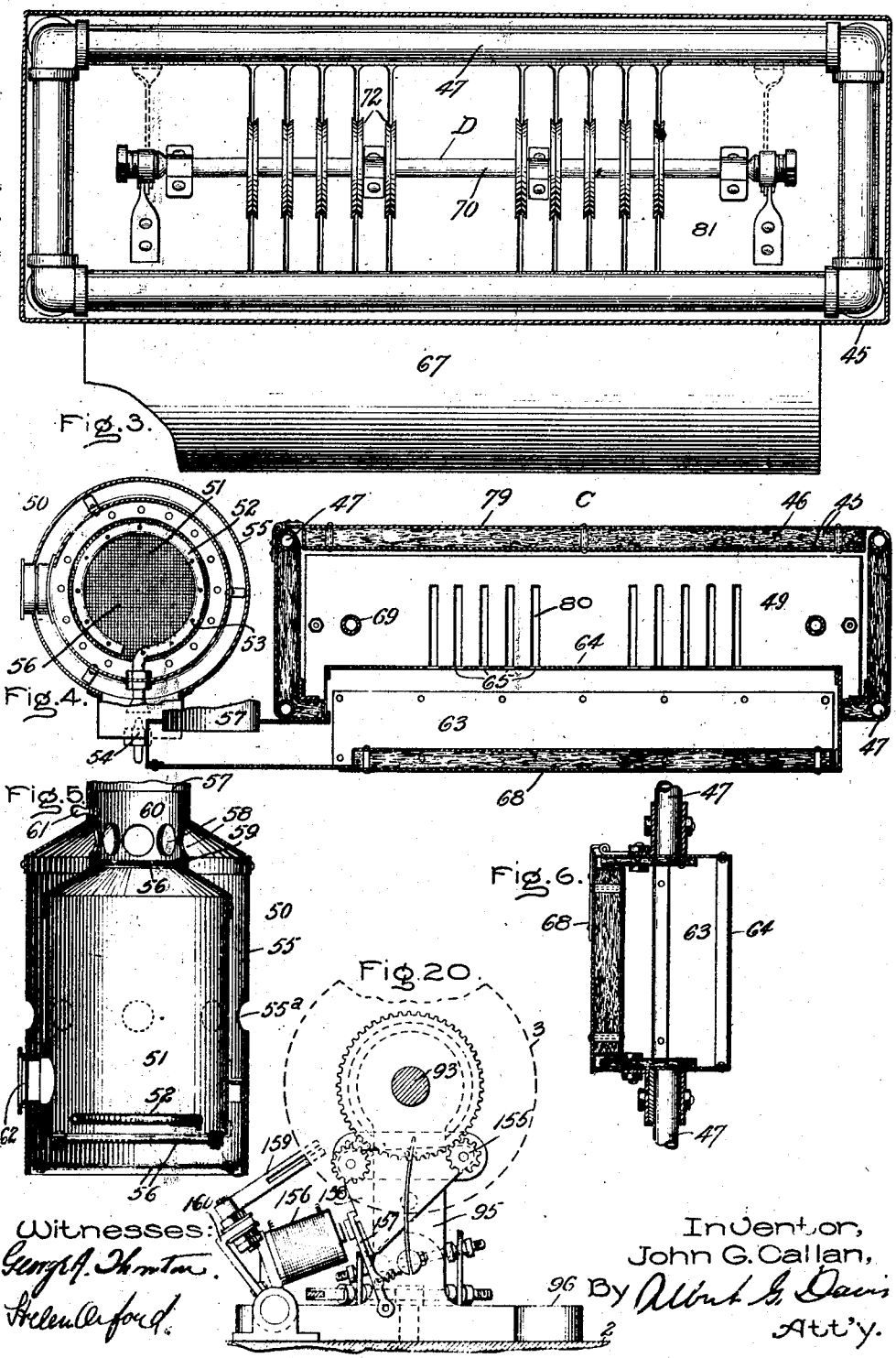

No. 894,592. PATENTED JULY 28, 1908.
J. G. CALLAN.
WIRE COATING MACHINE.
APPLICATION FILED MAY 9, 1905.

8 SHEETS—SHEET 4.

Witnesses:

Inventor,
John G Callan,

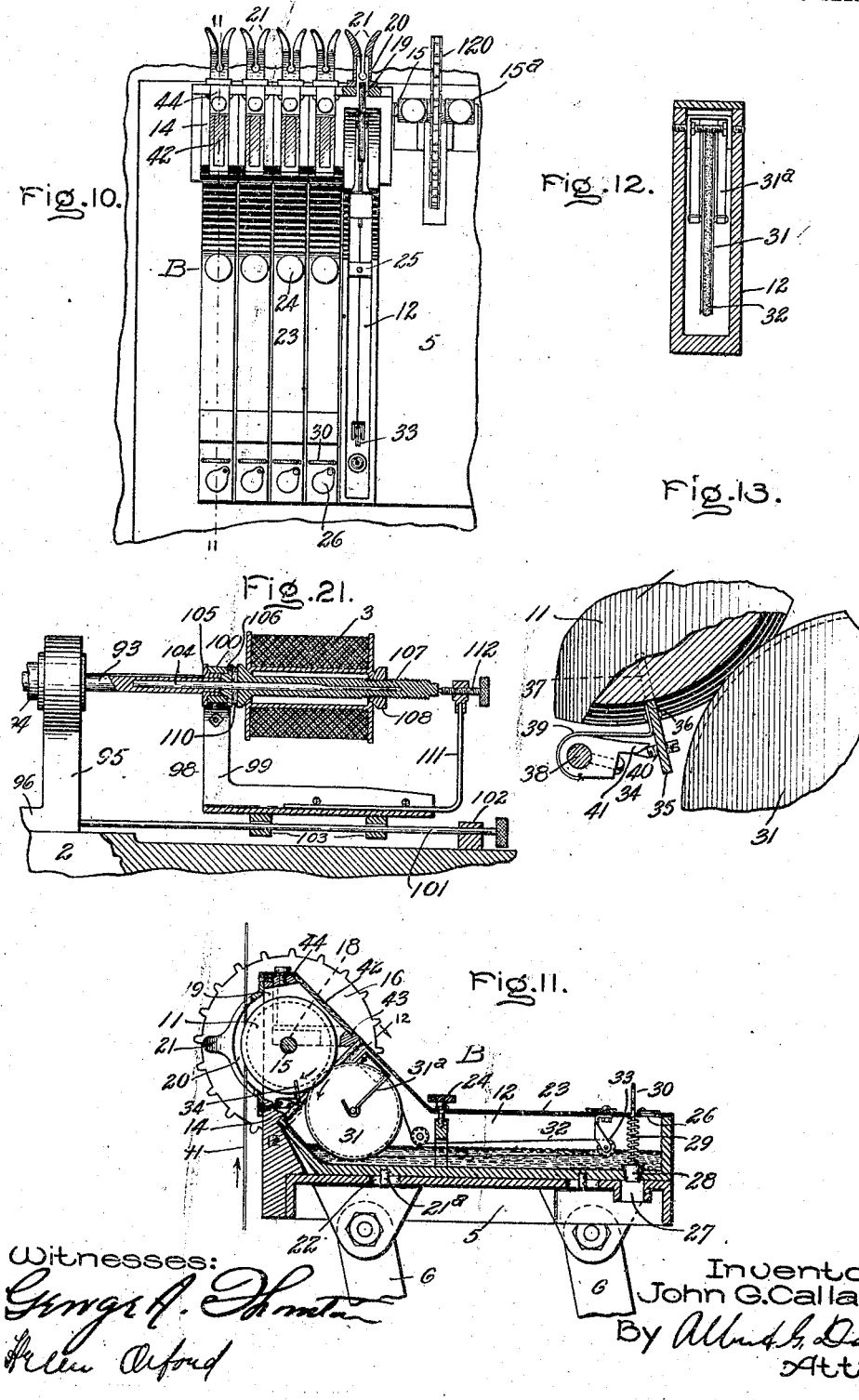

No. 894,592. PATENTED JULY 28, 1908.
J. G. CALLAN.
WIRE COATING MACHINE.
APPLICATION FILED MAY 9, 1905.
8 SHEETS—SHEET 6.
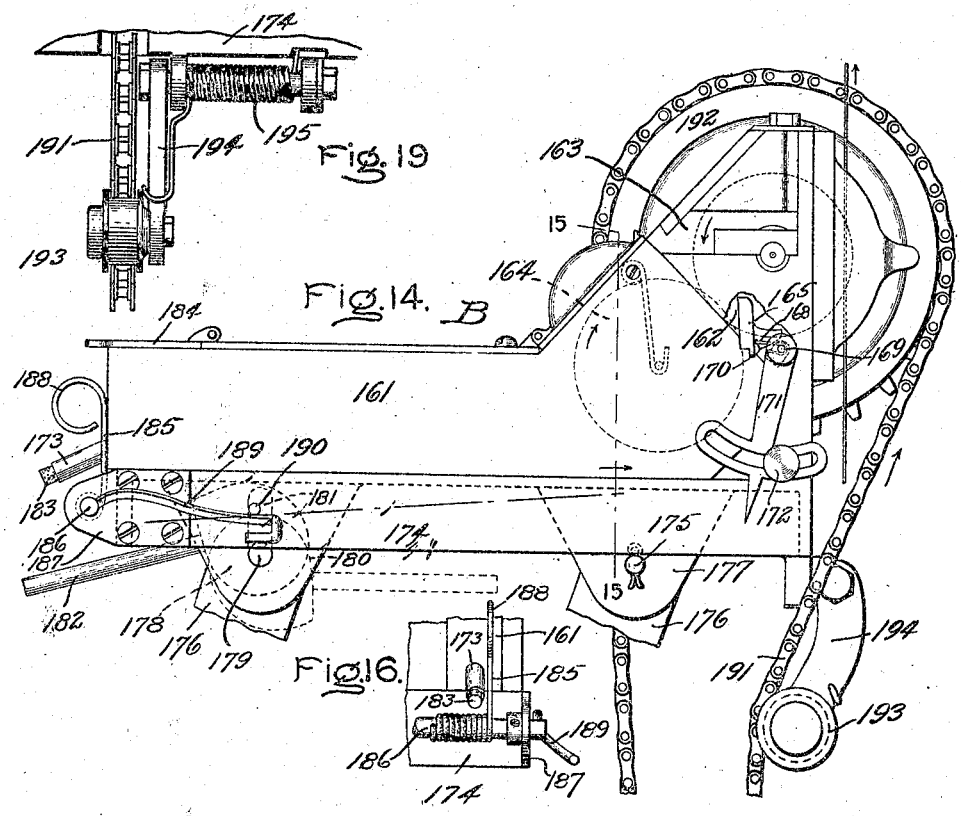
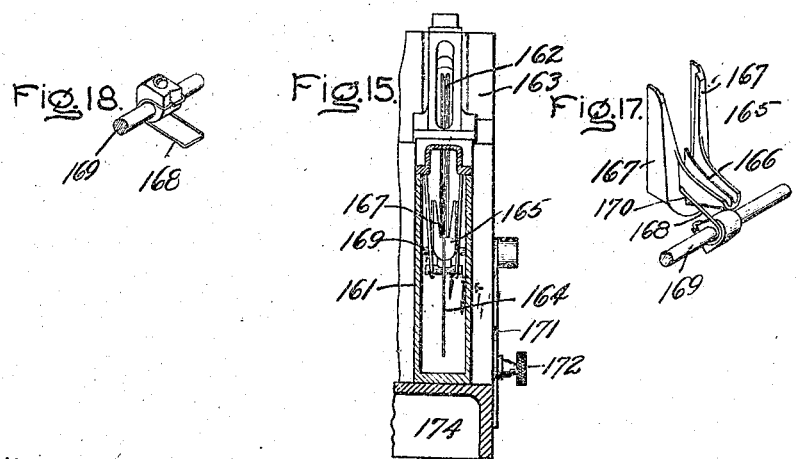
Witnesses
Inventor
John G. Callan
By Att'y.

No. 894,592.

PATENTED JULY 28, 1908.

J. G. CALLAN.
WIRE COATING MACHINE.
APPLICATION FILED MAY 9, 1905.

8 SHEETS—SHEET 7.

Witnesses:
George A. Thornton
Helen Alford

Inventor,
John G. Callan,
By Albert H. Davis
Att'y.

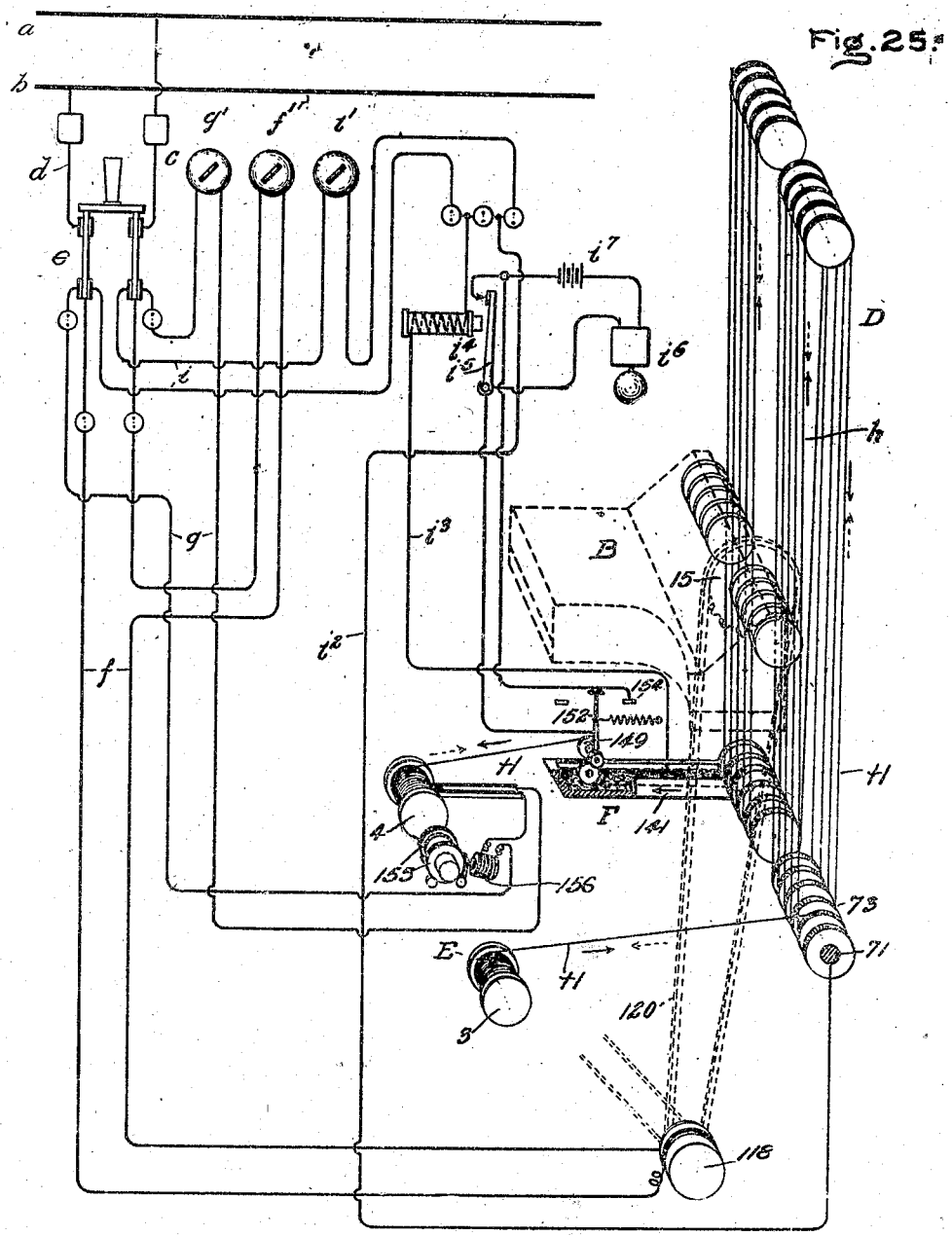

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

WIRE-COATING MACHINE.

No. 894,592.   Specification of Letters Patent.   Patented July 28, 1908.

Application filed May 9, 1905.  Serial No. 259,577.

*To all whom it may concern:*

Be it known that I, JOHN G. CALLAN, a citizen of the United States, residing at Lynn, county of Essex, State of Massachusetts, have invented certain new and useful Improvements in Wire-Coating Machines, of which the following is a specification.

My invention relates to a machine for coating conductors with film insulation. The terms "film insulation" signify a protective covering for a conductor applied thereto in liquid form, and subsequently solidified the film or covering being composed of a single coating of the insulating material or a plurality of superposed thin coatings, as desired.

My improved machine is designed for practicing single or multi-coating processes, and is especially adapted for coating wire of small sizes, such, for example, as is used for meter armatures, electromagnet coils, and other electrical apparatus; although it may be used for coating conductors of larger gage.

Another object of the invention is to provide a machine of compact, well-organized construction and which is reduced to a successful operating basis for manufacturing film insulated conductors of uniform and satisfactory quality, and in quantity for commercial use.

In practicing the coating process various substances for the insulating material may be used, such as collodion, cellulose compounds, varnishes, japans, rubber, enamel, or other insulating substances which are dissolvable in suitable volatile solvents and applicable in liquid form. The wire or conductor to be coated may be, and preferably is, covered with one or more preliminary coats of some adhesive, such as a rubber solution, following which one or a plurality of coats of the liquid insulation compound are applied. With some insulating materials one coat is sufficient, while with others a number of coats gives more satisfactory results. In coating wire with an insulation such as cellulose tetracetate which affords a particularly effective insulation by reason of its high insulating and non-hygroscopic properties, a multi-coating process is preferable, as this process is more advantageous for the reason that the compositions of the successive coats or baths may be varied so as to produce a film having the most satisfactory properties. That is to say, the first one or more coats of the insulating material (after the preliminary adhesive coats) may contain a certain proportion of adhesive with the necessary amount of softener to render the coat supple, while the succeeding coats may have less or no adhesive, and gradually less and less softener, so that the final layer when dry will be tough and comparatively hard and form a protective surface for the film, while the interior layers will be soft and pliable so that the conductor can readily bend without the film cracking or scaling off. Furthermore, the superposed layers reduce the possibility of coincidence of insulation faults. During the coating process, the wet conductor is passed through an oven after each application of the insulating material for baking the same, and after the baking of the final coat the finished conductor is passed through a test device for locating insulation faults, and is finally reeled on a shipping spool.

My machine for practicing these various steps comprises, in general terms, a coating device composed of a number of units by which the adhesive and coating materials are applied successively to the conductor, a carrier or stringing frame on which the conductor travels during the coating and drying stages, an oven or heater through which the conductor passes after each application of the coating material for drying the latter, a spooling apparatus which unreels the bare conductor from one spool and reels the finished conductor on another or shipping spool, a special form of driving mechanism for conveying the conductor in either direction through the machine, a test device for testing the finished conductor for insulation faults before the conductor is spooled, a tension indicator whereby a break in the conductor is immediately signaled, suitable power transmitting means for driving the spooling apparatus, the coating device and the driving mechanism for the conductor, and various details of construction, which will be more fully set forth in the following description.

Figure 7:
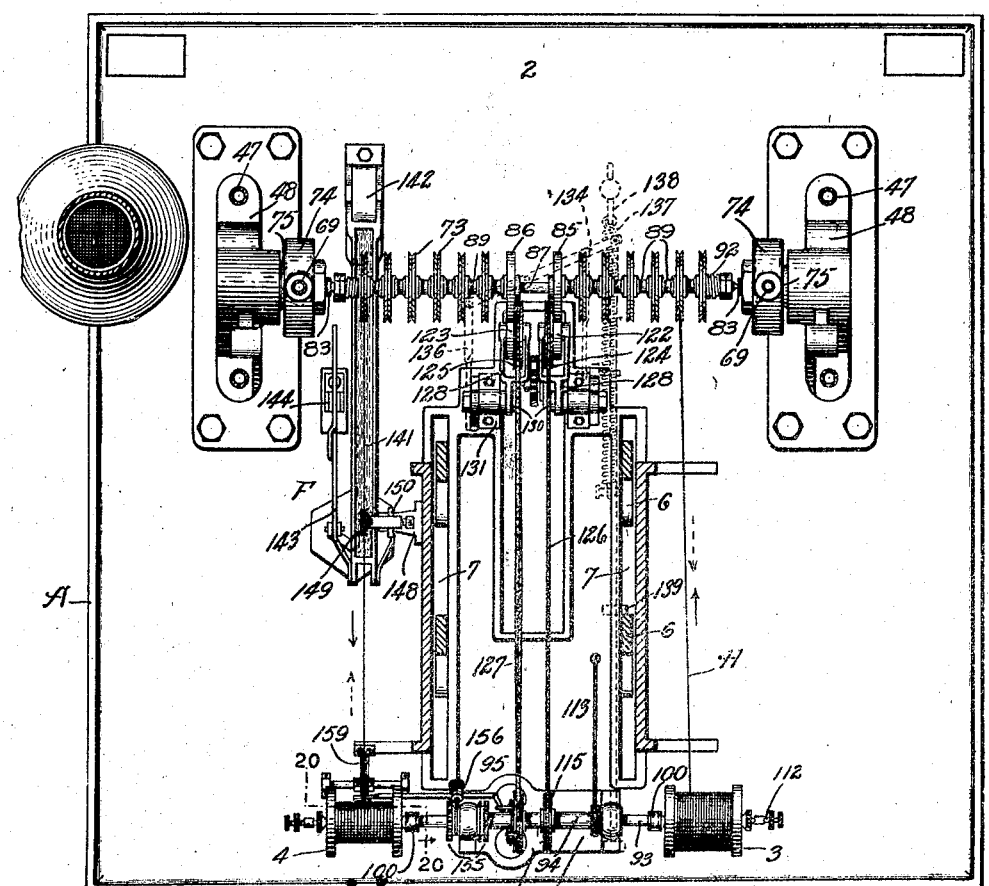
Figure 8:
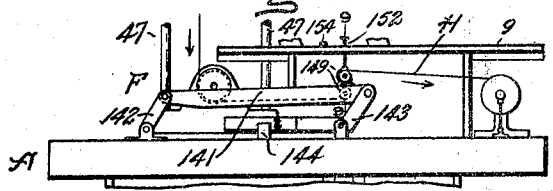
Figure 9:
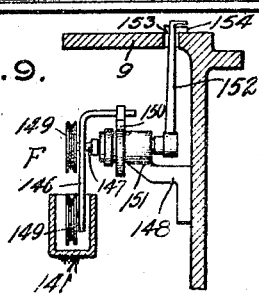
Figure 22:
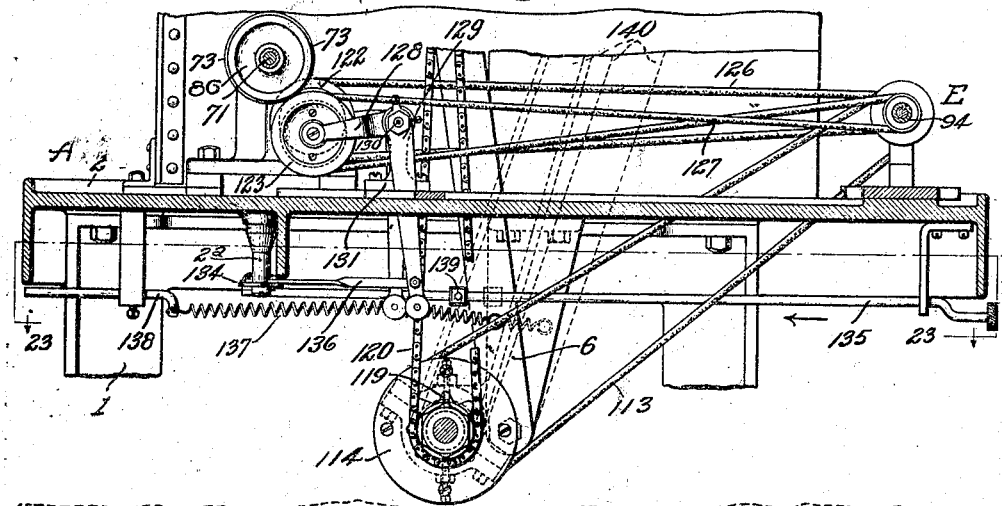
Figure 23:
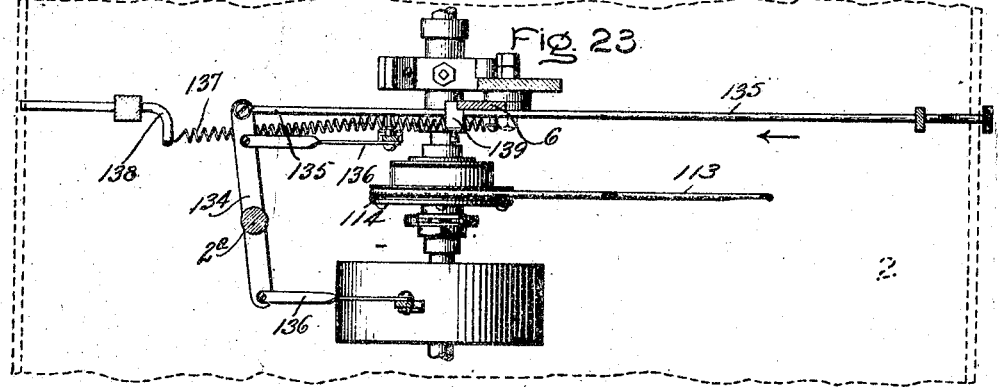
Figure 24:
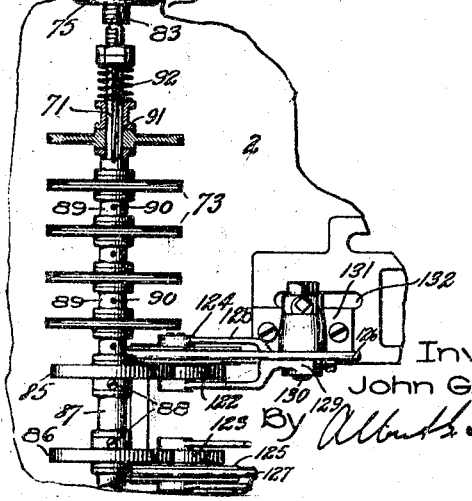

In the accompanying drawings, which illustrate one of several embodiments of which the invention is capable, Figures 1 and 2 are respectively a front and a side elevation of the machine showing the oven or drying chamber in section; Figs. 3 and 4 are respectively a transverse section of the oven taken on lines 3 3 and 4 4, Fig. 1, and drawn on an enlarged scale; Fig. 5 is a central vertical section of the furnace for heating the oven; Fig. 6 is a detail section of a heat-distributing chamber between the oven and the furnace; Fig. 7 is a horizontal section of the machine taken on line 7 7, Fig. 2; Figs. 8 and 9 are respectively a side and a front elevation of an insulation fault tester and tension indicator; Fig. 10 is an enlarged plan view of one group of units of the coating device; Fig. 11 is a longitudinal section of one of the units of the coating device taken on line 11 11, Fig. 10; Fig. 12 is a detail section taken on line 12 12, Fig. 11; Fig. 13 is a fragmentary view of a coating wheel and coöperating parts of one unit of a coating device; Fig. 14 is a side elevation of a modified construction of the coating device; Fig. 15 is a transverse section of one of the units taken on line 15 15, Fig. 14; Figs. 16 to 19 inclusive, are views of detail parts of Fig. 14; Fig. 20 is an enlarged view of a portion of the spooling apparatus taken on line 20 20, Fig. 7; Fig. 21 is a longitudinal section of one of the spool carriages of the spooling device; Fig. 22 is a vertical transverse section of a portion of the machine, showing the driving mechanism; Fig. 23 is a horizontal section on line 23 23, Fig. 22; Fig. 24 is a plan view of a portion of the driving mechanism for conveying the conductor in either direction through the machine; and Fig. 25 is a diagram of electric circuits including the motor for operating the machine, the test device and tension indicator, and the magnetic clutch between the motor and the means for operating the coating wheels.

Referring to the drawings, Figs. 1, 2 and 7, A represents the stand of the machine, B the coating device, C the drying oven, D the carrier or stringing frame for the conductor, E the spooling apparatus, F the combined insulation test device and tension indicator, G the electric motor for driving the various operating parts of the machine, and H the conductor or wire being coated.

The stand A comprises standards or legs 1 and a horizontal top 2 on which the various parts of the machine are supported. The front portion of the top is occupied by the coating device and spooling apparatus, and the rear portion is occupied by the stringing frame, the mechanism for driving the conductor, and the drying oven, which latter, in the present instance, is disposed in a vertical position so as to diminish the floor area covered by the machine; although the oven may be disposed horizontally or at any other angle where floor space is not an important factor.

With the several parts of the machine thus arranged the path of the conductor is as follows: The conductor unreels from a spool 3 in the spooling apparatus E and extends to and passes a number of times around the stringing frame D, which includes the mechanism for driving the conductor. On the frame the conductor is conveyed through the coating device B and the drying oven, so as to receive a coat of insulation and to dry the latter each time the conductor passes around the frame. From the frame the finished conductor is conveyed through the insulation test device and tension indicator F, and is then reeled upon a shipping spool 4. Passing the conductor around the stringing frame a number of times presents to the coating device a plurality of turns or lengths $h$ (shown in heavy lines, Fig. 1) so that the conductor receives successive coats while passing once through the machine, and is thus finished in one operation.

The coating device B is mounted on a swinging table 5, so that it may be moved into or out of operative relation to the several turns of the conductor on the stringing frame. The swinging table is supported in a horizontal position upon two parallel sets of links 6, Figs. 1, 2, 7 and 11. These links extend through and are movable in parallel transversely extending slots 7 in the top of the stand A, and are pivoted at their upper ends to the swinging table, and at their lower ends to depending brackets 8 on the underside of the stand top. A supplementary stationary table 9 is arranged on the stand in a horizontal position between the swinging table and the stand top. This stationary table is provided with corresponding parallel slots 10 through which the supporting links 6 extend. The end walls $10^a$, Fig. 2, of the slots 10 form rests for supporting the swinging table and coating device in operative and inoperative positions. The stationary table furthermore serves as a shield for covering the spooling apparatus and portions of the driving mechanism.

The coating device B is made up of a number of units, Figs. 10 and 11, each of which is adapted to apply a coat to the conductor as it passes through the machine. These units each comprises a carrier for applying the insulation to the conductor, such as a rotating peripherally-grooved wheel 11, a receptacle or tank 12 for containing the insulation solution, and means in the tank for conveying or feeding the insulating material to the groove of the coating wheel. In the present instance ten units are employed, Figs. 1 and 10 which number corresponds to the number of turns or lengths $h$ of the conductor on the stringing frame. The number, however, is immaterial to the principle of operation of the machine; one unit being used for a single coating process, two for a double coating process, three for a triple coating process, and so on.

The coating wheels are preferably mounted to rotate in a horizontal axis, and the conductor is passed tangentially through the grooves of the wheels, preferably in a vertical direction, so as to permit the coating material to be more evenly distributed on the conductor. The wheels are supported in a casing 14, Figs. 10 and 11, which is suitably secured at the rear portion of the swinging table. The wheels are keyed to a horizontal driving-shaft 15, which forms a common means for rotating them. The units are preferably, although not necessarily, arranged in two banks or groups, separated by a central space in which is located a driving sprocket 16, or its equivalent, for transmitting power to the wheel-carrying shaft. The said shaft is journaled in posts or pillars 15ª on the swinging table which are arranged at opposite sides of the driving sprocket 16 in contact with the hub thereof, so as to prevent lateral play of the shaft and the coating wheels. The shaft is also journaled in bearings 18 in the side walls of the wheel casings, Figs. 2 and 11. The rear walls of the wheel casings are preferably vertical or parallel with the several lengths h of the conductor, Fig. 11, and are provided with openings 19, through each of which a circumferential portion of the coating wheel extends, so that the conductor may pass tangentially through the groove. Over the projecting portion of each wheel is a mouth-piece 20, Figs. 10 and 11, for guiding the lengths of the conductor into the wheel grooves when the coating device is moved into operative relation to the conductor on the stringing frame. These mouth-pieces, which are removably secured to the casings 14, are preferably castings each provided with two diverging lips 21 which at their base are slightly separated to form slits that registers with the groove of its respective coating wheel.

The coating material may be contained in a single tank or vessel common to the several coating wheels. It is preferable, however, to provide individual tanks for the coating wheels, and each tank with its corresponding coating wheel, forms a unit. The tanks may be of any suitable shape; those shown being long and narrow, and closely nested together, and extending transversely of the machine. Each tank is removably secured in place on the swinging table 5, Fig. 11, by means of depending lugs 21ª, which engage in slots or depressions 22 in the table. The tanks are closed by covers 23, so as to prevent evaporation of the volatile solvent in the insulating solution. These covers which are removable so as to permit cleaning of the tanks, are secured in position by knurl-headed finger-screws 24, the threaded shanks of which extend through the openings in the covers and screw in transverse webs 25 formed integral with the side walls of the tanks. In order to fill the tanks slide-covered openings 26 are provided in the covers through which the coating material can be supplied, and discharge openings 27 are arranged in the bottom of the tanks for emptying them. These latter openings are closed by spring-pressed stoppers 28, each of which is provided with a pull rod 29 that projects upwardly through the cover of its tank and terminates in a grip 30.

The rear ends of the tanks communicate with the casings 14 containing the coating wheels, Fig. 11. Mounted in each tank at its rear end is a rotating transfer wheel 31 arranged below the level of the coating wheel, and dipping at its lowest point below the surface of the insulating material. The transfer wheel or disk is mounted on spring arms 31ª arranged in the tank; the function of the arms being to press the transfer wheel against its corresponding coating wheel with sufficient force to cause it to receive rotation from the latter, and thereby transfer insulating material to the coating groove. The transfer wheels are, or may be, provided with conveying belts 32, which assist in carrying the insulating material to the coating grooves. These belts extend around the circumference of the transfer wheels and over guide pulleys 33, Figs. 10 and 11 and are arranged to run longitudinally of the tanks with portions of their length passing through the insulating material. Feeding the insulating material to the coating wheels in this manner, it is essential to provide means for carefully gaging the quantity to be applied to the conductor. For this purpose a scraper 34 is arranged to coöperate with each coating wheel, Figs. 11 and 13. These scrapers are each arranged between the point of reception of the insulating material from the transfer wheel and the point of application of the material to the conductor. The scraper is preferably a blade having a tongue 36 corresponding in shape to the cross-section of the coating groove and into which it radially projects. On opposite sides of the tongue are guide jaws 37, Fig. 13, that span the edge of the coating wheel and engage with the side surfaces thereof. The scrapers are held in the vertical or approximately vertical position so that the surplus material removed from the coating grooves by the tongues may readily flow off the same and drip back into the tanks. The scrapers of each group of the coating units are mounted on a single shaft or other support 38, Fig. 13. In order to adjust the scrapers so that the tongues 35 permit the requisite amounts of material to be carried past in the coating grooves to the conductor, they are each supported on a flexible strip or spring 39, and by means of a set screw 40 in the scraper, which impinges upon a suitable abutment 41 fixed to the shaft 38, the tongue can be adjusted with respect to its coating groove. Above each coating wheel a sight glass 42 is provided, Figs. 10 and 11, through which ready inspection of the wheels may be made. The glasses are preferably removably secured in place so that access may be had to the wheels for cleaning the grooves thereof. For this purpose the glasses are each beveled at their ends, one end engaging with a shoulder 43 formed in the wall of the casing 14 and a removable plate 44 engaging the opposite end for securing the glass in place. It will be noted that the construction of each unit provides practically a complete inclosure which prevents evaporation of the insulating material and the entrance of dust.

As shown in Fig. 2, the coating device B is arranged adjacent to the lower end of the drying oven in such a position that the wet portions of the conductor pass immediately into the oven after leaving the coating wheels. The oven is an upright rectangular structure made of spaced double sheet metal plates 45 lined with suitable heat-insulating material 46, and a skeleton framework 47 of tubing Figs. 1 to 4. The uprights of the framework are rigidly anchored at their lower ends in blocks 48 that are firmly secured on the stand top 2, Figs. 1 and 2. The oven is of such length that with a given speed of travel of the conductor on the stringing frame, the wet insulation will be completely dried or hardened before the conductor passes over the sheaves at the upper end of the stringing frame. The oven is closed except where necessary provision is made in the bottom 49, Fig. 4, for the conductor passing into and out of the same.

Any suitable source of heat may be employed for heating the air supplied to the drying oven, such, for example, as steam or hot water pipes. This system is more feasible and economical in a factory where a large number of machines are employed and where steam or hot water heating facilities exist. In the present instance I have shown a gas heater or furnace 50, which is particularly adapted for isolated machines. The heater 50 comprises a combustion chamber 51 within which a coil or mixing tube 52 of the Bunsen type of burner is arranged, that is provided with a number of openings 53 for delivering jets of gas, Figs. 4 and 5, and a nozzle 54, Figs. 1 and 4, which supplies gas to the mixing tube. The combustion chamber is supported within a cylindrical casing 55, which is open at its lower end to permit air to enter the combustion chamber for supporting combustion. The lower end of the casing and also the ends of the combustion chamber are provided with diaphragms of wire gauze 56 for preventing entrance to the flame of any explosive gases which might form in the atmosphere from the volatile elements evaporated from the insulating material. The diameter of the casing 55 is larger than that of the combustion chamber, in order to provide a heating space between them. The air enters the heating space through the gauze bottom, and through openings 55ª in the wall of the casing at points intermediate its ends. The heated air mingles with the hot products of combustion from the combustion chamber in a flue 57 with which the heating space and combustion chamber communicate. The air in passing from the heating space to the flue 57 enters openings 58 arranged in the wall of a short connecting flue 59 between the combustion chamber and the flue 57, and the amount of air passing through the openings 58 is regulated by means of a cylindrical valve 60, Fig. 5. The valve is operated by a handle 61 which projects through a slot in the flue 57, and is secured to the valve. For starting the furnace a door 62 is provided in the wall thereof which permits access to the interior.

The heated air from the furnace passes first to a distributing chamber 63, Figs. 2, 4 and 6, from the flue 57; the function of the distributing chamber being to discharge the heated air into the drying oven in sheets or columns through which the conductor passes upon entering the oven. For this purpose, the rear wall 64 of the distributing chamber is provided with a plurality of vertical slots 65 shown in dotted lines in Fig. 1, and in section in Fig. 4; the said slots being disposed directly in front of the lengths $h$ of the conductor on the stringing frame. The distributing chamber is located at the lower end of the oven, hence the hot air flowing to the upper end acts upon the conductor while traveling the full length of the oven.

In order to regulate the draft through the oven or the temperature of the air, dampers or valves 66 are provided at the upper end, Fig. 2. Theses valves control communication between the oven and a hood 67 which conveys off the gases to the atmosphere at any suitable point. When a number of machines are employed, the hoods of the several machines are preferably connected with a common duct and a blower may be used with advantage for drawing off the gases. The draft through the oven may also be regulated by allowing atmospheric air to enter directly to the distributing chamber by opening the door 68, Figs. 2 and 6.

The stringing frame D is a vertical rectangular structure supported at its lower end on the stand and extends into the oven from the bottom thereof. It comprises two upright side bars 69, Figs. 1 and 2, and upper and lower horizontal shafts 70 and 71, Figs. 1, 2, 22 and 24, on which are mounted respectively sheaves 72 and 73, over which the wire passes. The coating device is arranged between the oven and the lower end of the stringing frame so that the conductor, in passing upwardly from the lower sheaves 73, is conveyed through contact with the coating device and thence to the oven.

In order that the conductor may be conveniently laid or strung on the frame D, the latter is pivoted at its lower end so that the upper end may swing downwardly in a vertical plane to an inclined or horizontal position within reach of the operator. The lower ends of the side bar 69 are provided with bearing eyes 74, which are mounted on horizontally disposed pivots or journals 75 arranged in the anchor blocks 48, Figs. 1, 2 and 7. Handles 76 are arranged on the side bars at a suitable point above the pivots to provide the necessary leverage for permitting the frame to be readily lowered by the operator. To counter-balance the weight of the frame two helical extension springs 77 are employed, which are attached at their upper ends to hooks 77ª secured to the side bars 69, and at their lower ends to stationary arms or abutments 78 mounted on the anchor blocks 48, as shown more clearly in Figs. 1 and 2. The points where the springs are attached to the arms are eccentric to and disposed preferably in front of the axis about which the frame pivots, so that when the frame is lowered the springs are expanded and act to oppose the weight of the frame. By suitably choosing the point of attachment it is possible to have the frame stable in the upper and lower positions and very nearly balanced at all intermediate points. In order to permit the frame to swing in and out of the oven, the rear wall 79 of the latter, Fig. 4, is hinged at one side to serve as a door which, when opened, permits the frame to be swung in or out of the oven. The bottom 49 of the oven is preferably carried by the frame to simplify the construction. Under some conditions it is preferable to omit this part 49 altogether. When it is used the several turns of the conductor are received in slots 80 provided in it. At the upper end of the frame below the shaft 70 may be a deflector or inclined plate 81, which is carried by the frame, Figs. 1, 2 and 3. This plate is also provided with slots for receiving the conductor. It serves to direct the gases to the hood and shields the sheaves and shaft located above it from the effects of the hot gases. It is inclined upwardly from the rear to a point between the dampers 66 and directs the gases through the lower damper opening. To permit cross-currents in the space above the deflector a valved opening 82 is provided in the door or rear wall 79 of the oven, Fig. 2, through which air enters and passes across the space, and discharges through the upper damper opening into the hood. Where solutions not requiring very high oven temperatures are used this deflector may be omitted for simplicity.

The lower shaft 71 is journaled in bearings 83 formed on the journals 75 of the stringing frame, Figs. 7 and 24. Hence, the axis of the shaft coincides with the axis on which the frame is adapted to swing. This is an important feature, as the distance between the upper and lower sheaves is thus maintained constant for all positions which the frame takes in its swinging movement; thereby preventing undue strain upon the conductor during the swinging movement of the frame.

The sheaves 72 and 73 are arranged in two groups, one on each side of a medial plane and directly in the rear of the groups of coating wheels, Fig. 1. The lower sheaves 73 operate as drivers for conveying the conductor through the machine, while the upper sheaves are idlers. The latter are loosely mounted to rotate on their shaft, which in turn rotates in bearings 84 at its ends. The shaft, thus driven by the sheaves, rotates at a velocity equal to their mean velocity. This construction permits of movement of the conductor over the sheaves with comparatively little friction, and also permits of relatively independent movement of the sheaves to equalize the tension between the several turns of the conductor.

A particular form of friction-drive is employed for imparting power to the driving sheaves 73, which has for its object to permit the driving power to be brought to bear on the conductor gradually when starting, so as not to produce excessive strains on the latter, and also to permit the tension between the various turns of the conductor to automatically equalize. The mechanism for accomplishing this comprises friction gears 85 and 86, Figs. 7 and 24, arranged on the lower shaft between the groups of sheaves, and separated by a central spacing sleeve 87, against the ends of which they are adapted to bear. The gears are splined to the shaft by screws 88, one gear being employed for driving the shaft in a forward direction, and the other for driving it in a reverse direction. The sheaves of each group are separated from each other and from the adjacent friction gear by spacing sleeves 89, which are splined to the shaft by screws 90, whose ends engage in a longitudinal groove 91 in the shaft, Fig. 24. At the outer ends of the shaft are adjustable compression springs 92 which impinge upon the outer sleeves and operate to maintain the sleeves, sheaves and gears in frictional engagement, to the end that power from the gears is transmitted to the sheaves through the shaft and the sleeves. The pressure, however, due to the springs, is such that the sheaves are capable of moving independently or of slipping, so to speak, so that the power for driving the conductor may be applied gradually in starting into operation, and the tension between the several turns of the conductor may be automatically equalized. It will be noted that the power for driving the conductor is applied at as many different points as there are driving sheaves, thus preventing excessive strain and breakage of the conductor as would be the case if the power were applied at one point.

The spooling apparatus E coöperates with the driving sheaves to convey the conductor through the machine. This apparatus constitutes the subject-matter of a copending application, and for an understanding of the details of construction and mode of operation thereof, reference is to be made to such application. A general description of certain features of the apparatus will here suffice to enable an understanding of the relation of the spooling apparatus to the various other parts of the machine to be reached. Referring to Figs. 1, 7, 20 and 21, the spooling apparatus comprises a rotating and reciprocating shaft 93 mounted within a hollow rotating driving shaft 94, and from which latter the shaft 93 projects at the ends. The shafts are supported in pedestals 95 on the frame 96, which are secured on the standtop 2. At the outer ends of the shaft 93 are spool carriages 98, in which the spools 3 and 4 are carried. These carriages, each comprise a frame 99, Fig. 21, which is provided with a cylindrical head 100 at the upper end of its vertical arm. The head receives the end of the shaft 93, and is connected therewith in such a manner as to permit the shaft to rotate therein while it reciprocates the carriage. Each carriage is guided on a rod 101, Fig. 21, which extends at its outer end through a supporting lug 102 from the standtop 2, and at its inner end screws into the frame 96 of the spooling apparatus. The rod passes through openings in guide lugs 103, depending from the carriage, whereby the latter is guided rectilinearly and prevented from revolving with the shaft 93. Extending from the ends of the shaft are spindles 104 rigidly secured thereto, which are adapted to support the spools. Each carriage is secured to the shaft by means of a flanged collar 105 rigidly fitted on the shaft, and a flanged collar 106 rigidly secured on the spindle. The cylindrical portions of the collars coöperate to form a bearing for the shaft in the cylindrical head on the frame of the carriage, and the flanges on the collars coöperate to rigidly secure the carriage to the shaft so as to reciprocate therewith.

The spools 3 and 4 are each arranged on a spool-shaped holder 107, which is provided with a central bore whereby it is assembled on the spindle 104, Fig. 21. The spool is rigidly held on its holder so as to rotate therewith by being clamped between the heads 108 at the ends thereof. One of the heads is preferably a nut which is removable for the purpose of inserting the spool on the holder. Power is imparted from the shaft to each spool through a friction or clutch device formed by the adjacent surfaces of the collar 106 and the inner head of the holder, between which is a washer or gripping member 110 which may be of felt. The gripping effect of the clutch is controlled by a spring 111, which constitutes a part of the spool carriage and is secured at one end to the frame 99, and the other end thereof is provided with an adjustable screw 112, that engages with and supports the outer end of the holder 107. The spring is adapted to urge the holder inwardly to cause the inner head thereof to impinge or grip with the member 110 and the latter to grip the collar 106, and by adjusting the screw the tension of the spring can be varied to obtain any clutching effect desired.

Any approved mechanism may be employed to impart simultaneous rotary and reciprocating motions to the shaft 93. I prefer, however, the mechanism disclosed in my concurrent application hereinbefore referred to, wherein the shaft 94 is employed to impart such motions to the shaft 93. The former shaft is driven by means of the motor G through a belt 113, which passes over grooved pulleys 114 and 115, respectively, on the motor shaft and the shaft 94, Figs. 1, 2, 7 and 22. The motor is supported on the depending bracket 117 on the table or stand-top 2. The motor is also the source of power for the other operating parts of the machine, serving to drive the coating wheels, and the driving mechanism for the sheaves 73. In order that the coating wheels may be thrown into or out of operation without interfering with the running of the motor a magnetic clutch 118 is employed, Fig. 1, between the motor shaft and a sprocket shaft 119, and extending from the latter shaft to the coating wheel shaft 15 is a driving chain 120, Figs. 1, 2 and 10.

The motor G is adapted to run in one direction, and consequently the shaft 94 is rotated continuously in one direction, as is also the shaft 93 which is driven thereby. It is to be noted that since the spools 3 and 4 are driven by the shaft 93 they both tend to wind the conductor, but by means of the clutch devices between the spools and the shaft 93, one or the other of the spools is permitted to slip with respect to the shaft and unwind the conductor due to the pull thereon exerted by the driving sheaves 73; that is to say, one clutch device is operative and the other inoperative when the sheaves 73 drive the conductor forwardly, and vice versa when the sheaves drive the conductor reversely through the machine. In view of the fact that the unwinding of the spool takes place in direct opposition to the rotation of the shaft, the clutch device between them serves to dampen out inertia which the spool might otherwise acquire and unwind the conductor when it was not desired.

Separate mechanisms are employed for imparting power to the driving sheaves 73. These comprise driving gears 122 and 123, which are adapted to frictionally engage with and drive the gears 85 and 86 respectively, Figs. 7, 22 and 24. The gears 122 and 123 are rigidly connected with grooved pulleys 124 and 125 that are driven respectively by a straight belt 126 and the cross-belt 127 that receive power from the driving shaft 94; the latter acting as a countershaft between the motor and the said pulleys. Of these mechanisms, the one with the straight belt is employed for forward driving of the sheaves, and that with the cross-belt is employed for reverse driving, and obviously they are adapted to operate one at a time. These mechanisms, for convenience of description, will be designated hereinafter as the "forward friction drive" and the "reverse friction drive" respectively. The gears 122 and 123, with their respective pulleys, are each mounted in a bifurcated arm 128 of a bell-crank lever 129. The levers are fulcrumed on pivots 130, which are mounted in bearing blocks 131 on the stand-top 2 under and slightly forward of the sheaves. The other arm of each bell-crank lever extends through a slot 132 in the top of the stand, and at its lower end is connected with an actuating mechanism. The actuating mechanism comprises a lever 134 fulcrumed on a depending projection 2ª, Figs. 22 and 23 on the top 2 of the stand, an actuating rod 135 (shown also in Fig. 2) attached to the lever and links 136 which connect the lever 134 with the bell-crank levers. With this arrangement, movement of the rod 135 throws one or the other of the friction drives into operation: that is to say: when the rod is pushed rearwardly, or in the direction indicated by the arrow, Figs. 22 and 23, the bell-crank lever of the forward friction drive will be operated in a manner to move the gear 122 into engagement with its companion gear 85, whereas pulling the rod in a forward direction causes the bell-crank lever of the reverse friction drive to be operated so that the gear 123 is moved into engagement with its companion gear 86. When wire is not being coated the friction-drives are held in an inoperative position, in order that the driving sheaves may move independently of them during the operation of stringing the conductor on the frame. For the purpose of bringing the driving members into engagement a motor is employed, such as a spring 137, Figs. 2 and 22, that is connected at one end to one of the links 6, which supports the swinging table 5, and at the other end to an adjustable abutment 138 supported on the stand-top 2. At a suitable point between the ends of the springs one of the bell-crank levers 129 is attached thereto. Hence, when one of the bell-crank levers is manually moved in one direction or the other, the spring is placed under tension and operates to return the bell-crank levers to their normal or inoperative position and thereby hold the friction gears out of mesh.

It is preferable to throw the forward friction-drive into operation automatically, and for this purpose the swinging movement of the table which carries the coating device is made use of, so that the throwing of the coating device into operation simultaneously renders the forward friction-drive operative. This is accomplished by the movement of the end of spring 137 which is attached to the swinging support or link 6, in consequence of the movement of this link necessary to throw the coating mechanism into operative relation with the wire. This movement of one end of the extended spring toward the other fixed end causes a like but lesser movement or tendency to movement on the part of each intermediate point. Assuming no external constraint, the movement of any point will be the same fraction of that of the actuated end that its distance from the abutment 138 is of the total extended length. Thus the point of attachment of spring 137 to bell crank 128 will move in the direction of 138 until it is stopped by contact of members 122 and 85. Further movement of the link 6 toward the abutment 138 gives rise to unbalanced spring tension urging the frictioned members 122 and 85 together and causing progressively increasing driving effort. A suitable adjustment of the point at which bell crank 128 is attached to the spring 137 is found adequate to adjust the friction so as to give a gradual start, coupled with a sufficient ultimate driving effort.

When the coating mechanism is out of action and the link 6 is in the position shown by dotted lines 140, Fig. 22, it is possible by means of rod 135 attaching to lever 134 to move either the forward or the reverse drive into engagement at will. It will be seen that this must not be possible when the coating mechanism and the wire are in operative relation. If the wire stopped while in contact with the solution-carrying wheels the previously deposited film would be dissolved off and if it reversed its direction the undried wire would immediately come into contact with sheaves 73 and be spoiled. For the purpose of automatically preventing this, an interlocking collar or abutment 139 is placed on the rod 135 in such position that when link 6 swings forward it engages or nearly engages this collar and it becomes impossible to move rod 135 to its disengaged or its reverse position without previously swinging the table, and hence the link 6, to the disengaged position.

In Figs. 2 and 22 the parts of the machine are shown in operative position for driving the wire forwardly through the machine. When the table 5 is moved out of engagement with the wire the link 6 moves to the position shown by dotted lines 140, Fig. 22, and thereby disengages from the abutment of the actuating rod and at the same time causes the drives to return to their normal position through the action of the spring as just explained. When it is desired to reverse the travel of the conductor, the actuator rod is pulled in a forward direction, causing thereby the bell-crank lever of the reverse friction-drive to be actuated so that the gear 123 is moved into mesh with the gear 86. During these operations the motor G is operating continuously, and consequently the gears 122 and 123 are driven continuously through the intermediate connections with the motor. When the drives are normally held in inoperative position the gears 122 and 123 thereof rotate idly and can be manually thrown into operation in the manner described.

The conductor, after receiving the final coat of insulation, passes from the last sheave of the stringing frame through an insulation test bath and tension indicator F, Figs. 7 to 9. The test device comprises a trough 141 located adjacent the last sheave of the stringing frame, and extends substantially parallel with the conductor between the last sheave and the spool 4. The trough 141 contains a conducting liquid, such as mercury, or preferably mercury covered with a layer of water in which the conductor is immersed so as to produce electric contact with the conductor in case of insulation faults. For this purpose, the mercury is connected in electric circuit with the conductor. As shown in Fig. 8, the trough is supported in such a manner that it may be lowered from the conductor so as to facilitate arranging the latter on the tension indicator. To this end it is supported at its rear end upon a link 142 pivoted on the stand-top 2 and at the front end is pivoted on one arm of a bell-crank lever 143 which is also a switch, fulcrumed on the stand-top 2. The other arm of the lever is adapted to engage between spring contacts 144, and serves to connect the trough in an electric circuit (not shown). The frictional engagement between the lever and the spring contacts is sufficient to support the trough in its raised position.

The tension indicator comprises a lever 146, Fig. 9, which is fulcrumed on a pivot 147 mounted in a bracket 148 that is secured to the supplemental table 9. On the lever 146 are mounted two pulleys 149, one above the other, or substantially at right-angle to the general direction of that portion of the conductor between the last sheave of the stringing frame and the spool 4. The conductor passes around the lower pulley, then upwardly and around the upper pulley, and thence to the spool. The tension on the conductor, due to the winding of the same on the spool, tends to move the lever into a horizontal position or parallel with the general direction of the conductor. This movement, however, is opposed by a coiled spring 150, Fig. 9, to which the upper end of the lever is attached. The spring is mounted on an arbor 151 in the bracket 148, and through the same imparts movement to an arm or switch 152 attached thereto. This arm projects upwardly through a slot 153 in the supplemental table 9; and located at the rear end of the slot is a contact 154, Figs. 8 and 9, which is connected in electric circuit with a suitable source of current (not shown). When the tension on the conductor is normal, the arm or switch 152 is drawn away from the contact. When the tension fails, as by breakage of the conductor, the arm swings rearwardly against the contact 154 and thereby closes a circuit containing a suitable signal. The circuits for the test bath and tension indicator are shown diagrammatically in Fig. 25. With these two safety appliances, the operator is immediately warned when insulation faults in the conductor and breakages occur, so that a machine may be immediately stopped.

In connection with the mechanism for reciprocating the shaft 93 of the spooling apparatus is a reversing device 155, Figs. 7 and 20, described fully in my co-pending application hereinbefore mentioned. The reversing device is controlled by electro-magnet 156, which releases a detent 157 that controls a spring-actuated carrier 158 for the pinions of the reversing device. The electro-magnet is connected in circuit with contacts 159, which are supported on a bracket 160 in the path of the flanges on the spool 4. The contacts are normally separated, and when either flange of the spool impinges upon the adjacent contact at the end of the stroke, the circuit is closed and the electro-magnet energized; thus changing the position of the pinions of the reversing device.

Fig. 25 illustrates diagrammatically the various circuits for the several electrically controlled devices of the machine. Current is supplied from mains $a$ and $b$ by leads $c$ and $d$ through the main double-pole switch $e$. From the switch extend three multiple circuits $i$, $f$, $g$, of which $f$ is connected with the clutch located between the motor G and the sprocket and chain mechanism for the coating wheels, in $g$ is connected the electromagnet and contacts of the motion-reversing device of the spooling apparatus, and in $i$ is connected the mercury test bath and the tension indicator. The several circuits are controlled by switches $f^1$ $g^1$ and $i^1$, which in practice are mounted upon the switch-board arranged at a suitable part of the machine convenient to the operator. The side $i^2$ of the circuit $i$ is grounded on the driving sheaves, so that the bare conductor is in electric connection with the circuit, and the other side $i^3$ is connected with the mercury-containing trough. Hence, when a bare spot on the conductor or fault passes through the mercury, the circuit is completed. Suitably arranged in the circuit I is a relay $i^4$, whose armature $i^5$ controls a local circuit in which is located a buzzer $i^6$ and a source of current $i^7$ therefor. Thus, when the circuit is completed by the occurrence of an insulation fault, the buzzer is sounded to warn the operator. When this occurs, the operator may immediately stop the machine and reverse the direction of travel of the conductor, so that the conductor may be returned to a point such that the bare spot can be recoated by again running it forwardly. The local circuit containing the buzzer is connected with the arm 152 of the tension indicator and the contact 154, so that when the conductor breaks the circuit is completed through the arm and contact and energizes the buzzer. In the diagram, the motor circuit has been omitted for the sake of simplicity.

The operation of the machine, generally stated, is as follows: Assuming the tanks of the coating device to be filled, the first one or two with adhesive, and the others with liquid insulating compound; the conductor strung on the frame; and the furnace lighted or steam heat turned on. The electric motor is first started. This drives the shaft 94 of the spooling apparatus and the gears 122 and 123 of the friction drives. The rotation of the shaft 93 with the shaft 94 does not affect the spools, as these remain idle for the time being until the driving sheaves 73 are thrown into operation. In other words the friction clutch devices between the shaft 93 and the spool holders act oppositely on the wire and hence are inoperative when the sheaves 13 are idle. The swinging table 5 is next moved rearwardly, so as to throw the coating device into operation. During this movement, the several lengths or turns $h$ of the conductor on the stringing frame are guided into the grooves of the coating wheel by the guide mouths of the coating device. By this operation the forward friction drive is brought into action by the movement of link 6 and thence that of spring 137 attached to it and also to the lower arm of the bell crank 129. This gradually imparts motion to the shaft 71 which in turn rotates the driving sheaves 73 and starts the conductor moving through the machine. The conductor now unwinds from spool 3 and winds on spool 4. The same movement which brings about this engagement of the forward drive also brings into engagement with 6, the interlocking piece 139 on rod 135 and prevents manual control of forward and reverse drives. Preferably somewhat before the conductor is set into motion by the throwing of the friction-drive, the operator closes the magnetic clutch circuit, and in consequence power is imparted to the coating wheels through the chain and sprocket mechanism connecting the same with the electric motor. With the parts thus operating, the bare conductor, passing through the groove of the first coating wheel, receives a first coat usually of a suitable adhesive although insulation may be applied directly and passes immediately into the oven wherein the coating is baked on the conductor. Passing from the oven the conductor is conveyed through the groove of the next coating wheel to receive a second coat of adhesive or insulation, as may be desired, and the said coat being baked as before, then follows another coat and another and so on until the requisite number has been applied. After the final coat, the conductor passes through the testing device and tension indicator to the winding spool. In case of an insulation fault the machine is immediately stopped; that is to say, the forward friction drive is thrown out of operation by moving the swinging table to its forward position, which permits the operator to manipulate the actuator rod 135 to throw the reverse friction drive into operation. The latter act causes the conductor to travel reversely through the machine, and when a suitable point is reached the operator stops the reverse friction drive and proceeds to recoat the portion containing the bare spot by operating the machine in the regular manner.

The modification shown in Figs. 14 to 19 inclusive, relate more particularly to the coating device. The tank 161, the coating wheel 162, and the frame or casing 163 for the wheels are substantially the same as in the construction hereinbefore described. Coöperating with each coating wheel 162 is a transfer disk or wheel 164, which is made of sheet metal and is supported to frictionally engage in the groove of the coating wheel to receive rotation therefrom. The periphery of the transfer wheel runs in the liquid insulation so that more or less of the insulation that adheres thereto is transferred to the groove of the coating wheel, Figs. 14 and 15. The scraper 165, Fig. 17, is formed with a rearwardly projecting tongue 166 that corresponds to the general curvature of the wheel. Guide jaws or extensions 167 also project rearwardly to extend over a greater area of the sides of the wheel, Fig. 17. These scrapers of both groups of units of the coating device are each supported on a spring holder 168 which is formed into a loop and rigidly secured to a shaft 169 mounted in the casing 163 for the wheels. Each scraper is provided with a transverse slot 170 by means of which it is supported on the loop. The outer end of each shaft 169 extends through the side wall of the casing, and has secured thereto an adjusting arm 171, whereby the scrapers of each group may be simultaneously adjusted. The adjusting arm 171 is formed with a segmental slot through which projects the shank of a set-screw 172 that screws into the side wall of the casing, and is adapted by means of its head to hold the arm in fixed position by clamping it against the wall of the casing. In order to readily empty the tanks, spouts 173 are arranged at the forward ends thereof and the table 174 on which the tanks are supported is adapted to be tilted so as to facilitate the discharge of the liquid insulation through the spouts. To tilt the table, the same is supported at its rear end on pins or pivots 175 between the pair of rear supporting links 176 and lugs 177 and at its front end on a cam 178, shown in dotted lines, which is mounted on a shaft 179 that extends parallel to the front end of the table and whose ends serve as pivots between the front supporting links 176 and the lugs 180 of the table. The lugs 180 of the table are provided with vertical slots 181 for receiving the pivots or ends of the shaft 179, so as to permit the table to be lowered or raised by means of the cam. The cam surface is adapted to engage with the under surface of the table so as to support the latter either in a horizontal or an inclined position. In order to operate the cam a handle 182 is provided therefor. The spouts 173 are normally closed by means of stoppers 183, and for filling the tanks hinged lids 184 are provided in the covers. The tanks are removably secured to the table by means of spring retainers 185. These are arranged at the front of the table to bear on the front ends of the tanks, and retain the latter on the table and in proper fixed relation to the wheel casing 163. The retainers are supported on a shaft 186, which is pivoted at its ends in brackets 187 secured to the table. The retainers are preferably wire springs secured to and coiled on the shaft, with one end projecting upwardly therefrom and formed into a loop or grip 188; the said upwardly projecting ends being adapted to bear against the front ends of the tanks. By this arrangement the retainers may be operated singly by pulling them forwardly by means of the grips, and thus release the tanks. To set or release the retainers simultaneously the shaft is provided with a lever or spring-arm 189, which is adapted to hold the retainers in set position by means of a pin 190, Fig. 14, extending from the side of the table, under which the arm engages. By disengaging the arm from the pin, the springs are simultaneously released so that the tanks may be removable together. In order that the swinging table may be moved into and out of operative position, the sprocket chain 191, which delivers power from the motor shaft to the gear or sprocket 192 coating wheel shaft, requires to have a certain degree of slack, for the reason that the center about which the table pivots and the axis of the motor shaft do not coincide. When the table is in its forward position the distance between the axis of the motor shaft and the axis of the coating wheel shaft is greater than when the table is in its rearward position. To provide this slack, the chain is equal to the maximum distance between the shafts, and a spring-pressed idler 193 is employed in connection with the sprocket chain, so as to take up the slack on the chain when the distance between the motor shaft and wheel shaft is minimum, i. e., when the table is in its rearward position. The idler is supported on the rear end of the swinging table on an arm 194, which is constantly acted upon by a spring 195, to maintain idler in operative position with respect to the chain.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,

1. In a machine for coating electric conductors, the combination of a coating device comprising a plurality of wheels for applying the coating material, means for conveying the conductor tangentially over the wheels in a vertical direction, and means for moving the coating device into and out of coöperative relation with the conductor.

2. In a machine for coating electric conductors, the combination of a coating device, a carrier on which the conductor travels in substantially a vertical direction, and means for movably supporting the coating device in coöperative relation to the conductor on the carrier.

3. In a machine for coating electric conductors, the combination of a coating device, a carrier around which the conductor travels a number of times in a substantially vertical direction, means pivotally supporting the carrier, and a movable support for the coating device whereby the latter may be moved into or out of coöperative relation with the conductor.

4. In a machine for coating electric conductors, the combination of a movable coating device comprising a plurality of wheels, a carrier for the conductor located in coöperative relation with the coating device and arranged to convey the conductor tangentially over the wheels in a vertical direction, and an oven arranged to receive the conductor after passing through the coating device.

5. In a machine for coating electric conductors, the combination of a coating device, a stringing frame or carrier on which the conductor travels in coöperative relation to the coating device, a movable table for supporting the coating device, an oven in which the stringing frame is disposed, and a supporting stand.

6. In a machine for coating electric conductors, the combination of a coating device, an upright carrier or stringing frame for the conductor which is arranged in coöperative relation with the coating device, an oven in which the carrier is located and arranged to be movable into and out of the same, and a supporting stand on which the coating device, carrier and oven are located.

7. In a machine for coating electric conductors, the combination of a movable coating device, a carrier for the conductor, a spooling apparatus, and a driving mechanism for driving the conductor in a forward or reverse direction.

8. In a machine for coating electric conductors, the combination of a coating device, a carrier which supports the conductor in coöperative relation to the coating device, means for driving the conductor in either direction on the carrier, and an apparatus coöperating with the driving means for winding and unwinding the conductor.

9. In a machine for coating electric conductors, the combination of a coating device, a carrier for the conductor, a friction-driving mechanism acting at a plurality of points on the conductor for imparting motion thereto, and an apparatus which simultaneously permits the unwinding of the bare conductor and winds the finished conductor.

10. In a machine for coating electric conductors, the combination of means for coating the conductor, a carrier or stringing frame around which the conductor passes a number of times, comprising shafts and independently movable sheaves mounted on and frictionally driven by said shafts to impart motion to the conductor.

11. In a machine for coating electric conductors, the combination of a pivoted upright stringing frame for the conductor, a coating device which is located at the lower end of the frame, a drying oven inclosing the upper part of the frame, and means for driving the conductor on the frame through the coating device and the oven.

12. In a machine for coating electric conductors, the combination of an upright stringing frame for the conductor which is pivoted at its lower end, an oven which incloses the upper end of the frame, means for permitting the frame to swing in and out of the oven, a coating device, and means for driving the conductor around the stringing frame.

13. In a machine for coating electric conductors, the combination of an upright stringing frame for the conductor which is pivotally supported at its lower end, means for counter-balancing the weight of the frame during pivotal movement thereof, a driving mechanism for the conductor, and a coating device.

14. In a machine for coating electric conductors, the combination of a stringing frame for the conductor, driving sheaves thereon over which the conductor passes successively to receive motion therefrom, means for frictionally driving the sheaves which permits independent movement of the latter, and a coating device.

15. In a machine for coating electric conductors, the combination of a rectangular stringing frame pivotally supported at its lower end, rotatably mounted shafts at the ends of the frame, sheaves on the shafts which are rotatable independently thereof, driving means for the sheaves, and a coating device.

16. In a machine for coating electric conductors, the combination of a stringing frame or carrier around which the conductor passes a number of times comprising rotatable shafts, sheaves rotatably mounted thereon, means for frictionally driving the sheaves of one shaft to impart motion to the conductor, and a coating device.

17. In a machine for coating electric conductors, the combination of a carrier or stringing frame for the conductor comprising rotatable shafts, sheaves rotatably mounted thereon, means between the sheaves of one shaft and rotatable therewith which frictionally engage with the sheaves for driving them, and means for coating the conductor.

18. In a machine for coating electric conductors, the combination of a coating device, and a carrier or stringing frame for the conductor comprising parallel rotatable shafts, means for frictionally driving one of the shafts, sheaves on the shafts which are rotatable thereon, sleeves keyed on the frictionally-driven shaft which are arranged between the sheaves, and means for causing the sheaves and sleeves to frictionally engage with each other, whereby the sheaves are rotatable with or independently of the shaft.

19. In a machine for coating electric conductors, the combination of a coating device, and a stringing frame or carrier for the conductor comprising parallel rotatable shafts, means for frictionally driving one shaft in either direction, sheaves on the shafts which are rotatable thereon, sleeves keyed on the frictionally-driven shaft which are arranged between the sheaves, and means for causing the sheaves and sleeves to frictionally engage with each other whereby the sheaves are rotatable with or independently of the shaft.

20. In a machine for coating electric conductors, the combination of a coating device, and a stringing frame or carrier for the conductor comprising parallel shafts rotatably mounted, means for frictionally driving one shaft in either direction, rotatable sheaves on the shafts, sleeves on the frictionally-driven shafts which are located between the sheaves thereon, and an adjustable spring for maintaining the sheaves and sleeves in frictional driving engagement with each other.

21. In a machine for coating electric conductors, the combination of a coating device, and a stringing frame or carrier for the conductor which comprises parallel shafts rotatably mounted, means for frictionally driving one shaft in either direction, rotatable sheaves on the shafts, sleeves keyed to the frictionally-driven shaft which are located between the sheaves, means for causing the sleeves to drive the sheaves, and a spooling apparatus which coöperates with the frictionally-driven sheaves for winding the conductor driven thereby.

22. In a machine for coating electric conductors, the combination of a coating device, a stringing frame for the conductor provided with reversible frictionally-driven sheaves, a spooling apparatus, and a motor for driving the sheaves and the spooling apparatus.

23. In a machine for coating electric conductors, the combination of a stringing frame or carrier for the conductor including means for driving the conductor in either direction around the frame, a spooling apparatus coöperating with the said means, a motor for driving the apparatus and the said means, coating wheels, and a controllable driving connection between the motor and the coating wheels.

24. In a machine for coating electric conductors, the combination of a stringing frame including means for driving the conductor, a frictional drive for the said means, a coating device, a movable support for the coating device by which the latter is moved into or out of coöperative relation with the conductor on the frame, and means controlled by the movement of the said support for rendering said drive operative or inoperative.

25. In a machine for coating electric conductors, the combination of a stringing frame including means for driving the conductor, a frictional drive for said means which is normally inoperative, a coating device, a movable support for the coating device by which the latter is moved into or out of coöperative relation with the conductor on the frame, and means controlled by the movement of the said support for rendering said drive operative or inoperative.

26. In a machine for coating electric conductors, the combination of a stringing frame including means for driving the conductor, friction gears for operating the said means which are normally inoperative, a coating device adapted to be moved into or out of coöperative relation with the conductor on the frame, and means for automatically rendering the friction gears operative when the coating device is moved to its coöperative relation with the conductor.

27. In a machine for coating electric conductors, the combination of a carrier or stringing frame for the conductor, means for driving the conductor around the carrier, a frictional drive on the said means, a coating device adapted to be moved into or out of operative relation with the conductor on the carrier, and means for automatically controlling the said frictional device whereby the conductor is driven when the coating device is set into operation.

28. In a machine for coating electric conductors, the combination of a stringing frame or carrier including means for driving the conductor, a coating device, and a spooling apparatus comprising a rotating and reciprocating shaft, spools carried thereby, and means between the shaft and spools whereby one spool unwinds and the other winds the conductor.

29. In a machine for coating electric conductors, the combination of a stringing frame including driving means for conveying the conductor over the frame in either direction, a coating device, and spooling apparatus which comprises a rotating and reciprocating shaft, spools carried thereby, and means whereby either spool unwinds the conductor according to the direction of pull on the latter due to the said driving means while the other spool winds the conductor due to the rotation of the said shaft.

30. In a machine for coating electric conductors, the combination of a stringing frame including means for driving the conductor over the frame in either direction, a coating device, and a spooling apparatus comprising a rotating and reciprocating shaft, spools carried thereby, and clutch devices between the spools and the shaft.

31. In a machine for coating electric conductors, the combination of a stringing frame including means for driving the conductor over the frame in either direction, a coating device, a spooling apparatus comprising a rotating and reciprocating shaft, spools carried thereby, clutch devices between the spools and the shafts, and means for adjusting the clutching effect of said devices.

32. In a machine for coating electric conductors, the combination of a stringing frame including frictional driving means for conveying the conductor over the frame in either direction, a coating device, and a spooling apparatus comprising a rotating and reciprocating shaft, spool carriages connected with the ends of the shaft, spools mounted on the carriages, clutch devices between the spools and the shaft, and a yielding adjustable means for varying the clutching effect of said devices.

33. In a machine for coating electric conductors, the combination of a stringing frame including means for moving the conductor in either direction over the frame, a coating mechanism, and a spooling apparatus comprising a rotating and reciprocating shaft, spool carriages connected therewith, spools, holders in the carriages for the spools, a spring for urging each holder into frictional engagement with the shaft to receive rotation therefrom or to permit independent rotation of the holder, and means for varying the tension of each spring.

34. In a machine for coating electric conductors, the combination of a coating device, a spooling apparatus, a stringing frame including means for driving the conductor, separate forward and reverse driving mechanisms for the said driving means, said mechanisms comprising friction gears, and means for throwing the gears into or out of operation.

35. In a machine for coating electric conductors, the combination of a coating device, a spooling apparatus, a stringing frame including driving sheaves for imparting motion to the conductor, separate forward and reverse driving mechanisms for the said sheaves, and a common actuator for throwing either of said mechanisms into operation.

36. In a machine for coating electric conductors, the combination of a coating device, a spooling apparatus, a stringing frame including means for driving the conductor, separate forward and reverse driving mechanisms for the said driving means, said mechanisms each comprising frictional gears, and means movably supporting one of said gears, an actuator for throwing the gears into or out of operation, and a connection between the said supporting means and the actuator.

37. In a machine for coating electric conductors, the combination of a coating device, a spooling apparatus, a stringing frame including means for driving the conductor, separate forward and reverse driving mechanisms for the said driving means, each mechanism comprising friction gears, and means movably supporting one of said gears, an actuator for throwing the mechanisms into or out of operation, a connection between the said supporting means for the gears and the actuator, and a spring for holding the movable gears normally out of operation.

38. In a machine for coating electric conductors, the combination of a coating device, a spooling apparatus, a stringing frame, including a driving shaft and sheaves thereon for imparting motion to the conductor, separate mechanisms for driving the said shaft for forward or reverse movement of the conductor, each mechanism comprising a friction gear on the shaft, a gear adapted to coöperate therewith, and a lever carrying the latter gear, a connection between the levers, an actuator attached to the said connection for throwing either of the movable gears into engagement with its respective gear, a spring for normally holding the movable gears out of operation, and means for driving the movable gears in opposite directions.

39. In a machine for coating electric conductors, the combination of a coating device, a spooling apparatus, a stringing frame, including a rotatable shaft, and frictionally-driven sheaves for imparting motion to the conductor, separate mechanisms adapted to drive the shaft in opposite directions, each mechanism comprising a driven gear on the shaft, a driving gear therefor, means for supporting the driving gear, a pulley carried by the driving gear, a connection between the supporting means for the driving gears, an actuator attached to the said connection for moving either driving gear into engagement with its respective driven gear, a spring for holding the driving gears normally out of operation, and belts for operating the pulleys and driving gears in opposite directions, and a driving mechanism for the belts.

40. In a machine for coating electric conductors, a coating device composed of units, each unit comprising a wheel provided with a peripheral coating groove, a tank containing liquid coating material, and a disk-shaped wheel supported in circumferential contact with the groove of the wheel to receive rotation therefrom and to convey coating material to the groove.

41. In a machine for coating electric conductors, a coating device composed of units, each unit comprising a grooved coating wheel, a tank for the liquid insulation, and a rotating transfer wheel located below the coating wheel and engaging at its periphery in the groove of the wheel to supply insulation thereto from the tank.

42. In a machine for coating electric conductors, a coating device composed of units, each comprising a coating wheel, a tank containing the coating material, a transfer wheel, and elastic means for supporting the latter wheel in peripheral engagement with the coating wheel to receive rotation therefrom.

43. In a machine for coating electric conductors, a coating device composed of units, each comprising a coating wheel, a tank containing the coating material, a transfer wheel, and springs which support the transfer wheel to run in the insulation and maintain the wheel in engagement with the coating wheel to receive rotation therefrom.

44. In a machine for coating electric conductors, a coating device composed of units, each comprising a coating wheel, a tank containing the coating material, a disk of sheet metal arranged in the tank and dipping at a peripheral point in the coating material, and springs supporting the disk in peripheral engagement with the coating wheel to be rotated thereby for conveying coating material to the latter.

45. In a machine for coating electric conductors, the combination of a coating wheel, and a yieldingly-supported scraper which is disposed substantially in a vertical position to permit the surplus insulation to readily drip therefrom.

46. In a machine for coating electric conductors, the combination of a grooved coating wheel, a scraper comprising a tongue disposed in the groove of the wheel for removing the surplus coating material therefrom, and guides at the sides of the tongue which engage with the wheel.

47. In a machine for coating electric conductors, the combination of a plurality of coating wheels, scrapers therefor, and a common support on which the scrapers are yieldingly mounted.

48. The combination of a plurality of grooved coating wheels, scrapers therefor which enter the grooves, and an adjustable support on which the scrapers are mounted whereby the latter are simultaneously adjustable.

49. In a machine for coating electric conductors, the combination of a plurality of coating wheels, scrapers therefor, a common support, springs between the scrapers and the support, and means for adjusting the support.

50. In a machine for coating electric conductors, the combination of a plurality of coating wheels, scrapers therefor, an adjustable support, means for yieldingly attaching the scrapers to the support, and means for simultaneously adjusting the scrapers with respect to the wheels.

51. In a machine for coating electric conductors, the combination of a plurality of coating wheels, a casing for the wheels, scrapers, a shaft in the casing on which the scrapers are mounted, and means exterior to the casing for adjusting the scrapers.

52. In a machine for coating electric conductors, the combination of a plurality of coating wheels, a casing in which the wheels are mounted, scrapers for the wheels, a shaft mounted in the casing for supporting the scrapers, an arm arranged exterior to the casing for adjusting the scrapers, and means engaging the arm for holding the scrapers in adjusted position.

53. In a machine for coating electric conductors, the combination of a coating device including a plurality of tanks, a supporting table for the said device, and retaining means for the tanks which permit the latter to be singly or collectively removable.

54. In a machine for coating electric conductors, the combination of a coating device including a plurality of tanks, a table for supporting the said device, springs on the table for retaining the tanks in position, and means for simultaneously releasing the springs.

55. In a machine for coating electric conductors, the combination of a coating device including a plurality of tanks, a table for supporting the said device, a plurality of spring retainers for holding the tanks in position on the table, and means for releasing or setting the springs.

56. In a machine for coating electric conductors, the combination of a coating device including a plurality of tanks, a table for supporting the said device, a plurality of spring retainers for holding the tanks in position on the table, a shaft to which the spring retainers are attached, and means for operating the shaft to set or release the said retainers.

57. In a machine for coating electric conductors, the combination of a coating device including a plurality of tanks, a table for supporting the said device, a plurality of spring retainers for holding the tanks in position on the table, a shaft on the table to which the spring retainers are attached, an operating arm mounted on the shaft for setting and for releasing the retainers, and grips on the retainers for independently releasing the latter from the tanks.

58. In a machine for coating electric conductors, the combination of a coating device including a plurality of tanks for the coating material, a table for supporting the tanks, and means for tilting the table to empty the tanks.

59. In a machine for coating electric conductors, the combination of a coating device including a plurality of tanks for the coating material, discharging spouts for the tanks, a table supporting the coating device, and means for tilting the table for facilitating the discharge of material from the tanks.

60. In a machine for coating electric conductors, the combination of a coating device including a plurality of tanks for the coating material, a table for supporting the tanks, discharging spouts at one end of the tanks, stoppers for the spouts, a pivotal support for the table adjacent the ends of the tanks opposite the spouts, and means at the opposite end of the table for tilting the latter to facilitate the discharge of material through the spouts.

61. In a machine for coating electric conductors, the combination of a coating device including a plurality of tanks for an insulating material, discharge spouts at the front ends of the tanks, stoppers for the spouts, a table for supporting the coating device which is pivoted adjacent its rear end, and means at the front end for tilting the table.

62. In a machine for coating electric conductors, the combination of a coating device including a plurality of tanks for an insulat ing material, discharge spouts at the front ends of the tanks, stoppers for the spouts, a table for supporting the coating device which is pivoted adjacent its rear end, a cam supporting the front end of the table, and means for operating the cam for lowering the table from or raising it to a substantially horizontal position.

63. In a machine for coating electric conductors, the combination with a supporting table, a coating device comprising a plurality of coating wheels, and tanks for the insulating material which are removable from the table independently of the coating wheels.

64. In a machine for coating electric conductors, the combination of a supporting table, a casing mounted thereon, coating wheels arranged in the casing, and a plurality of tanks for holding the insulating material which are removably mounted on the table.

65. In a machine for coating electric conductors, the combination of a supporting table, a casing thereon, coating wheels mounted in the casing, tanks on the table for holding the insulating material, and means for conveying insulating material from the tanks to the wheels.

66. In a machine for coating electric conductors, the combination of a supporting table, a casing thereon, coating wheels in the casing, means for rotating the wheels, and tanks for the insulating material which are arranged on the table and communicate with the casing.

67. In a machine for coating electric conductors, a coating device comprising a casing, a plurality of coating wheels therein, a driving shaft for the wheels, independent tanks for the coating material which communicate with the casing, and means for conveying the coating material from the tanks to the wheels.

68. In a machine for coating electric conductors, a coating device comprising a casing having openings in the wall thereof, a plurality of coating wheels in the casing which project peripherally through the openings to receive the conductor, tanks containing the coating material, and means for conveying the coating material from the tanks to the coating wheels.

69. In a machine for coating electric conductors, a coating device comprising a casing having openings in the wall thereof, coating wheels in the casing which project through the openings, mouth pieces disposed over the projecting portions of the wheels, and closed tanks for holding the coating material which communicate with the wheel casing and form with the latter an approximately complete inclosure for preventing evaporation of the coating material.

70. In a machine for coating electric conductors, the combination of a carrier for the conductor, a coating device which is movable to or from the conductor, said device comprising a coating wheel, and a means for guiding the conductor into coöperative relation to the coating wheel.

71. In a machine for coating electric conductors, the combination of a carrier for the conductor, a coating device which is adapted to be moved into or out of engagement with the conductor, said device comprising means for applying coating material to the conductor, and means for guiding the conductor into coöperative relation to the said means for applying the coating material.

72. In a machine for coating electrical conductors, the combination of a grooved coating wheel movable into and out of engagement with the conductor, and a bell-mouthed member movable with said coating wheel to engage and guide the conductor into coöperative relation to the wheel when said wheel is moved into engagement with the conductor.

73. In a machine for coating electric conductors, the combination of a carrier for the conductor, a plurality of coating wheels which are collectively movable with respect to the conductor on the carrier, and guiding members disposed over each wheel for guiding the conductor into engagement with the wheels.

74. In a machine for coating electric conductors, the combination of a carrier for the conductor, a plurality of grooved coating wheels, a casing for the wheels which is provided with openings in its wall through which the wheels project, mouth pieces arranged over the projecting portions of the wheels for guiding the conductor into the grooves thereof, and a movable table on which the casing is mounted whereby the wheels are movable to and from the conductor.

75. In a machine for coating electric conductors, the combination of means for supporting the conductor during the coating on which it is wound a number of times, coating wheels which correspond in number to the turns or winds of the conductor on the supporting means, a swinging support for the coating wheels whereby they can be quickly moved into or out of operative relation to the several turns of the conductor, and a mechanism for positively driving the coating wheels.

76. In a machine for coating electric conductors, a plurality of coating wheels, a movable support for the wheels for moving the latter simultaneously to or from the conductor, and a means for simultaneously and positively driving the coating wheels.

77. In a machine for coating electric conductors, the combination of a carrier for the conductor, a coating wheel, a table for supporting the coating wheel, a motor, and a sprocket and chain driving mechanism between the motor and the coating wheel, the said mechanism including an idler which automatically maintains the tension of the chain during movement of the table.

78. In a machine for coating electric conductors, the combination of a means for driving the conductor in forward or reverse direction, a coating wheel, and means for driving the wheel in one direction.

79. In a machine for coating electric conductors, the combination of means for driving the conductor in forward or reverse direction, a coating wheel, a motor, and means for connecting and disconnecting a coating wheel and motor.

80. In a machine for coating electric conductors, the combination of a winding and an unwinding spool for the conductor, a mechanism for rotating the winding spool, means independent of the said mechanism and located between the spools for driving the conductor, a coating wheel, a motor connected to the driving means, and a controllable connection between the motor and coating wheel.

81. In a machine for coating electric conductors, the combination of means for driving the conductor, a coating wheel, a motor, a controllable driving connection between the motor and the said means, and a controllable driving connection between the motor and the coating wheel.

82. In a machine for coating electric conductors, the combination of a device for driving the conductor, a coating wheel, a motor, separate controllable power transmitting connections between the motor and the said device for driving the conductor in forward or reverse direction, and a controllable power transmitting connection between the motor and the coating wheel.

83. In a machine for coating electric conductors, the combination of a device for driving the conductor, a coating wheel, a motor, separate controllable power transmitting connections between the motor and the said device for driving the conductor in forward or reverse direction, a controllable power transmitting connection between the motor and the coating wheel, and a support for the coating wheels which permits the latter to be removed from the conductor during reverse travel of the latter.

84. In a machine for coating electric conductors, the combination of a carrier for the conductor, mechanisms for driving the conductor in forward or reverse direction, a coating wheel or wheels which are movable to and from the conductor, and means controlled by the movement of the coating wheel or wheels for preventing the direction of travel of the conductor from being reversed while the wheel or wheels are in operation.

85. In a machine for coating electric conductors, the combination of an insulation test device, means which supports the conductor to move in a predetermined path, and supporting means whereby the device is movable into or out of operative relation with respect to the conductors.

86. In a machine for coating electric conductors, the combination of an insulation test device, means which supports the conductor to move in a predetermined path, and means which supports the test device in operative relation to the conductor and at the same time connects the said device in electric circuit.

87. In a machine for coating electric conductors, the combination of a mechanism for driving the conductor, a carrier for the conductor, a spooling apparatus for winding the conductor, and a signal device located between the driving mechanism and the spooling apparatus for indicating breakage of the conductor.

88. In a machine for coating electric conductors, the combination of a spool which winds the conductor, a spool which unwinds the conductor, and a driving means which applies power to the conductor at a number of points and thereby distributes the strain thereon.

89. In a machine for coating electric conductors, the combination of a spool which winds the conductor, a spool which unwinds the conductor, a carrier for the conductor located between the spools, and a driving means which gradually applies power to the conductor at a number of points between the spools.

90. In a machine for coating electric conductors, the combination of a spool which unwinds the conductor, a spool which winds the conductor, a carrier for the conductor located between the spools, and a plurality of independent driving means located between the spools which apply power gradually to the conductor at a number of points and operate to maintain the tension on the conductor uniform.

In witness whereof, I have hereunto set my hand this sixth day of May, 1905.

JOHN G. CALLAN.

Witnesses:
JOHN A. McMANUS, Jr.,
HENRY O. WESTENDARP.